United States Patent Office 3,438,914
Patented Apr. 15, 1969

3,438,914
WATER-BASE PAINT COMPOSITION
Emil A. Krockenberger, Tonawanda, N.Y., assignor to National Gypsum Company, Buffalo, N.Y., a corporation of Delaware
No Drawing. Filed Nov. 18, 1966, Ser. No. 595,366
Int. Cl. C09d 5/02, 3/26
U.S. Cl. 260—17.4                    9 Claims

ABSTRACT OF THE DISCLOSURE

Water-based coating compositions resistant to staining due to leaching of tannins and especially suitable for water-soluble-tannin rich woods such as redwood and cedar are composed of pigment, drying oil emulsion or latex, a tannin precipitant such as potassium antimony tartrate or guar gum, and an aluminum salt or antimony potassium tartrate as a dye mordant. Glucose or formaldehyde are added to synthetic latices to remove, by reduction, traces of polymerization catalyst.

---

This invention relates to a new and improved paint composition. More particularly, it relates to a water-base paint composition which is resistant to staining and discoloration when applied over exterior wood surfaces, including redwood and red cedar surfaces.

In recent years, water-base paints such as latex paints and oil-in-water emulsion paints have achieved considerable commercial acceptance and have displaced solvent-base paints for many applications. The commercial acceptance of water-base paints may be attributed to their many desirable properties such as ease of application and clean-up, freedom from solvent odor, speed of drying, and the like. In addition, water-base paints may be thinned with water, thereby eliminating the hazard due to the flammability of most of the organic solvents used in solvent-base paints. Despite their many attractive properties, water-base paints have some disadvantages which makes them unsuitable for certain applications. One such disadvantage is that water-base paints tend to become stained and discolored when applied over new (that is, previously unpainted) exterior wood surfaces, particularly over redwood or red cedar surfaces. Due to this staining and discoloration, it has not been feasible heretofore to use only a water-base paint system in providing protective and decorative coatings over wood surfaces which are to be exposed to weathering conditions, such as shakes, shingles, and clapboards. This staining and discoloration is caused by the presence of colored, water-soluble, naturally occurring substances such as tannins and natural dyes in the wood, particularly in redwood and red cedar materials. Since these colored substances are water-soluble, they are leached from the wood substrate when water-base paints are applied thereover and penetrate or bleed through the paint film, regardless of the number of coats applied, thereby staining and discoloring the paint and resulting in an unattractive appearance. While it has been suggested in recent years to incorporate lead salts and/or lead-containing pigments in water-base paints in order to minimize new wood staining, such paints have not been wholly satisfactory in preventing staining of the finish coat. Therefore, it has been necessary heretofore to use solvent-base oil primers on exterior wooden surfaces in order to prevent such staining and discoloration, the solvent-base oil primer sealing the surface of the wood. However, as noted above, solvent-base paints are not as desirable to use as water-base paints.

It is, therefore, an object of the present invention to provide a water-base paint composition which is resistant to staining and discoloration when applied over exterior wood surfaces.

Another object of the invention is to provide a water-base paint composition which prevents water-soluble wood tannins and dyes from leaching through and staining water-base finish paint coatings.

Another object is to provide a method for preventing staining and discoloration of water-base paints applied over wood surfaces.

Various other objects and advantages will appear from the following description of the invention and the novel features will be pointed out hereinafter in the appended claims.

According to the present invention, staining and discoloration of water-base paints are prevented by incorporating in the paint, additives which precipitate and inactivate the tannins and which fix the water-soluble dyes present in the wood within the paint film. Thus the water-base paint composition of this invention, when applied as a primer coating over new exterior wood surfaces, inactivates and ties up the tannins and dyes in the primer paint film so that they are prevented from leaching through and staining the paint. The subsequent application of a finish or top decorative coating of a conventional water-base paint over the primer coating provides a suitable protective and decorative coating for the wood surface which is free from staining and discoloration due to the leaching of the tannins and dyes from the wood. This makes it possible to provide durable, weather-resistant and stain-resistant paint coatings on exterior wood surfaces using only a water-base paint system, that is a water-base primer and a water-base coating. Thus, the water-base paint composition of the present invention which is to be applied as a primer coating over exterior wood surfaces, contains an additive to precipitate and inactivate the tannins and an additive to fix the water-soluble dyes present in the wood, in conjunction with an aqueous dispersion of a natural or synthetic resin or an aqueous emulsion of a drying oil as the vehicle, opacifying pigments and conventional paint modifying agents. In addition, as will be discussed in more detail hereinbelow, the pH of the paint composition is controlled so that the primer composition has an acid or neutral pH value.

The naturally occurring, water soluble tannins found in wood are prevented from leaching through the water-base paint composition of this invention by incorporating in the composition a material which reacts with the tannins to form water insoluble compounds which are precipitated and held within the primer paint film. It has been found that antimony potassium tartrate,

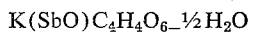

commonly known as tartar emetic, is an effective tannin precipitant and does not adversely affect any of the working properties of the paint. The tartar emetic is incorporated in the primer paint composition in amounts of from about 10 to 50 pounds of tartar emetic per 100 gallons of the paint composition, with an amount of 25 pounds or tartar emetic per 100 gallons of the paint being preferred to precipitate and inactivate the tannins. While antimony potassium tartrate is the preferred additive for precipitating the tannins in the primer paint film, guar gum may also be incorporated in the primer composition as a tannin precipitant.

The naturally occurring, water soluble wood dyes are prevented from leaching through the water-base paint composition by incorporating in the composition a material which functions as a dye mordant to fix the dyes within the primer paint film. To be effective, the material must not only fix the dyes within the paint film, but must also be compatible with the other components of the primer composition, so as not to adversely affect the working properties, stability, etc. of the primer. Suitable materials for this purpose have been found to be aluminum salts which are slightly acidic and which precipitate out of an aqueous solution at a pH of above about 7. Examples of such aluminum salts which have been found to be effective dye mordants in water-base paint compositions include aluminum sulfate, aluminum phosphate, and hydrated double sulfates of aluminum and univalent metals such as sodium, potassium and ammonium. Such hydrated double sulfates are commonly referred to as alum. The aluminum salts may be added to the composition as such, or may be formed in situ. Generally, the aluminum salt is incorporated in the paint composition in amounts ranging from about 10 to 20 pounds per 100 gallons of the composition, with an amount of 15 pounds of the aluminum salt per 100 gallons of the paint composition being preferred to fix the dyes. When the primer composition is applied over exterior wood surfaces, the aluminum salt in the primer effectively fixes the water-soluble wood dyes in the primer paint film by forming stable water-insoluble, compounds of aluminum and the dye. Since the dyes, like the tannins, are insolubilized and held in the primer paint film, they are prevented from leaching through and staining subsequently applied water base finish coatings. It should also be noted that antimony potassium tartrate, in addition to functioning as a tannin precipitant, also acts as a dye mordant to fix the water-soluble dyes within the primer paint film, so that, if desired, only the tartar emetic need be incorporated in the paint composition to precipitate the tannins and fix the dyes. However, it is generally preferred to include the aluminum salt in the composition to fix the dyes.

While staining and discoloration of conventional water base paints is, as discussed above, due to the leaching of tannins and dyes from the wood, several additional factors are also related to this staining problem. Thus, it has been discovered that the tannins and wood dyes have pH indicator effects, so that these materials change from a light yellow color at acid and neutral pH values to a deep reddish-brown or purple color at alkaline pH values. Since, according to the present invention, the tannins and wood dyes are precipitated and fixed in the primer paint film, it is necessary that they are present in the form of the light colored compounds. When present in this form they are effectively covered by the subsequent application of a conventional waterbase finish coating. Also, the tartar emetic does not function effectively as a tannin precipitant at alkaline pH values. Therefor the pH of the paint composition of this invention is maintained at slightly acidic or neutral values, with a pH in the range of 6 to 7 being preferred. If the composition, as formulated has an alkaline pH, as usually occurs with latex paints, the pH may be lowered to within this range by the addition of weak acids to the primer composition. Weak acids which may be used include phosphoric acid, boric acid, carbonic acid, acetic acid, and the like. Phosphoric acid is preferred for it not only is capable of reducing the pH to the desired range and is compatible with the other components of the composition, but it also provides the additional benefit that when the primer is applied over surfaces containing iron nails, the phosphoric acid reacts with the iron to form insoluble, substantially colorless ferric phosphates. This reaction prevents the formation of black iron tannates which also tend to discolor the paint. Strong acids are not used to lower the pH of the system for they cause corrosion of iron nails. The amount of acid added to the composition is dependent upon the initial pH of the primer and the concentration of the acid, but the amount of acid added must be sufficient to reduce the pH of the composition to within the desired range, i.e. about 6 to 7. In addition to the use of weak acids to reduce the pH value of the composition, it has been found that the pH of latex paints may be reduced to the desired range by incorporating formaldehyde in the composition. The formaldehyde, together with the tartar emetic (added as the tannin precipitant) buffers the pH of latex primers to values within the desired range. Usually, up to about 5 pounds of formaldehyde per 100 gallons of primer composition may be added, depending on the initial pH of the latex primer composition.

It has also been found that oxidizing agents which are usually present in latex paints will react with the tannins to form permanent dark colored compounds in the primer paint film. These oxidizing agents are believed to be the remains of polymerization catalysts such as peroxides, persulfates, perborates, etc., used in the formation of latices by emulsion polymerization techniques. In order to prevent the formation of the dark colored compounds resulting from the presence of such oxidizing agents, reducing agents are incorporated in the composition when latices are used as the binder. Glucose and formaldehyde have been found to be effective reducing agents in a latex paint composition to prevent oxidation of the tannins to dark colored compounds when the paint is applied over new wood surfaces. Glucose, which is also known commercially as corn syrup and starch syrup, is obtained as a clear, colorless, syrup-like liquid which is soluble in water and has a solids content of about 80%. The formaldehyde is usually added to the latex primer in the form of an aqueous solution containing about 37% formaldehyde and 5% methanol to inhibit polymerization. Other concentrations, inhibited or uninhibited, may also be used. Generally up to about 10 pounds of the reducing agent are added per 100 gallons of the latex primer. While other reducing or anti-oxidizing agents may be used, glucose and formaldehyde are preferred for they perform other functions in the primer in addition to acting as reducing agents. Thus, the formaldehyde also functions as a preservative for the paint and the glucose also functions as a pigment dispersant and an anti-flocculent for the pigment particles.

The novel additives, which precipitate the tannins and fix the wood dyes in the paint composition of this invention, may be incorporated in any conventional water base paint composition. The term "water-base paint composition" as used in describing and claiming the present invention includes paint compositions in which the vehicle is an aqueous dispersion of a synthetic or natural resin that is latex paints) as well as paints in which the vehicle is an aqueous emulsion of a drying oil. Generally, it is preferred to incorporate the additives in oil emulsion paint compositions for oil emulsion paints have good can stability and application characteristics and have excellent penetrating ability for adhesion through old chalky paint surfaces. In addition, oil emulsion paints usually have slightly acidic pH as formulated, are reducing systems, and do not contain any free oxidizing agents so that it is usually not necessary to incorporate in oil emulsion paints, the weak acid and/or the reducing agents discussed hereinabove. Any of the conventional drying oils known to be useful in the preparation of oil emulsion paints may be used in the present invention, including linseed oil, tung oil, safflower oil, dehydrated castor oil, soybean oil, and the like, including combinations of two or more of such oils. A combination of tung oil and linseed oil is preferred as the binder, the binder containing up to 10% tung oil and 90% or more linseed oil. Generally from about 150 pounds to 250 pounds of the drying oil per 100 gallons of the paint composition is used. Greater or lesser amounts may, of course, be used depending upon the specific properties desired.

Any of the conventional driers which are known to be useful in the formulation of oil emulsion paints may be used in the composition of the present invention to promote the more rapid solidification of the drying oils. Suitable driers include metallic soaps such as the naphthenates, tallates and linoleates of cobalt, calcium, lead, zinc, manganese, chromium, iron and nickel, and combinations thereof, with from about 1 pound to 30 pounds of drier included in 100 gallons of the paint composition. The amount of drier used will of course vary depending on the drier used, the rate of solidification desired, and the like.

As noted above, the tannin precipitant and dye mordant additives may also be incorporated in latex paint compositions. While latex paint compositions incorporating these additives provide suitable resistance to staining and discoloration when applied to exterior wood surfaces, the use of latex paint composition is somewhat less desirable than oil emulsion paints. This is due to the fact that the use of an aqueous dispersion of one or more latices as the binder in the paint composition presents several problems not encountered when oil emulsion compositions are used. Thus, as discussed above, latex paint systems usually contain free oxidizing agents, which makes it necessary to incorporate a reducing agent in the composition. Also, most waterbase latex paints usually have an alkaline pH as formulated, and require the addition of a material to lower the pH to slightly acid or neutral values in order to prevent the tannins and wood dyes from being present in the form of dark colored compounds, and enable the tannin precipitant to function effectively. Any of the numerous latices which are generally known to be used in the preparation of latex paints may be used in the composition of this invention. Broadly, any of the various resinous and rubber-like elastomeric products which are available in stable aqueous latex form and are capable of coalescing into a pigmented film when brushed, sprayed or rolled onto a surface may be used in this invention. An excellent primer composition has been obtained having as the binder a combination of an acrylic copolymer and polyvinyl chloride latices, this combination producing a tough, flexible resin with good penetrating properties and excellent wet adhesion. It is desirable, for the purposes of the present invention, when formulating latex paint compositions, to use a latex having an acid pH, so that the composition will have an acid pH, thereby making the addition of the weak acid unnecessary. Thus, while most latices have an alkaline pH, some are acid. For example, a fine particle size vinyl acrylate copolymer latex, obtained under the trade name Ucar 180, has a pH of about 5. When such an acidic latex is used as the binder in the composition of this invention, it is not necessary to incorporate the weak acid in the paint.

Pigments which are conventionally used in water base paints may be used in the paint composition of this invention. Such pigments include prime white pigments such as titanium dioxide (rutile and anatase grades), basic carbonate white lead, lithopone, zinc oxide and the like as well as extender pigments such as barium sulfate, calcium sulfate, magnesium silicate, silica, mica and the like.

In addition to the components discussed hereinabove, other conventional paint modifying agents may, if desired, also be incorporated in the composition. The use of these modifying agents and the amounts used may, of course vary, and are dependent upon the particular properties desired in the paint formulation, as is well known in the art. Thus, anti-foam agents such as polyalkylene glycol, tributyl phosphate, anionic surface-active blends of high melting, sulfated, saturated fats containing about 60% solids, and the like may be advantageously added to inhibit formation of foam in the process of preparing the paint. Plasticizers such as dibutyl phthalate, diethylene glycol monoethyl ether, tricresyl phosphate and the like may be added to increase the flexibility of the primer paint film. Dispersing agents such as aliphatic or aromatic sulfonates, the sulfolignins, aliphatic sulfates and the like may be added to aid in holding the finely divided pigment particles in a dispersed state. Wetting agents such as isooctyl phenoxy polyethoxy ethanol, alkyl phenoxy poly (ethylene oxy)-ethanol, and the like may be added to obtain proper dispersion of the pigment particles in water. Colloidal thickeners, such as water soluble cellulose derivatives including hydroxyethyl cellulose, methyl cellulose, sodium carboxymethyl cellulose; natural gums including guar gum, gum tragacanth, caraya gum; and the like may be added to provide optimum rheological properties to the paint. Anti-flocculating agents may also be added in order to retain proper dispersion of the pigment particles. However, the anti-flocculating agents that are usually used in water-base latex paints, namely casein and lecithin, are not effective at neutral or acid pH values, and are consequently not effective in the present composition. It has been found that glucose and gum arabic are effective anti-flocculating agents in paint compositions having a pH of 7 or below, and either of these materials may be used. It should be noted that if gum arabic is used as the anti-flocculating agent, only guar gum should be used as the thickener, if it is desired to add a thickening agent, for gum arabic is not compatible with other conventional thickeners. Other additives such as fungicides, mildewcides, and agents to control the brushability and mechanical stability of the paint composition may also be added if desired.

The water-base paint composition of this invention is readily applied over previously unpainted exterior wood surfaces and over previous painted, chalking paint surfaces by various methods such as brushing, spraying or rolling. It has excellent penetration and good flexibility with toughness even at temperatures below freezing. When applied as a primer coating over exterior wood surfaces, it effectively stops staining and discoloration. It is compatible with all colors in the California Ink Coloring System, and performs satisfactorily under commercially available water base decorative paints. Thus, when the paint composition of this invention is applied as a primer coating over exterior wood surfaces, any of the commerically available pigmented water-base paints may subsequently be applied as a top finish or final decorative coating, thereby providing a durable, non-tacky finish having excellent resistance to the deteriorating effects of weathering and having excellent resistance to staining and discoloration due to the leaching of water-soluble substances from the wood.

The invention will now be more fully described with reference to several specific examples which are intended to be illustrative only. The stain-resistant paint may be made by mixing the ingredients in any suitable order. However, the procedure described in the examples generally is preferred.

Example I

A stain-resistant, water-base latex paint composition was prepared in the following manner.

| Ingredients: | Pounds |
| --- | --- |
| Titanium dioxide | 175 |
| Aqueous dispersion of acrylic copolymers containing 47% latex solids | 180 |
| Aqueous dispersion of polyvinyl chloride latices containing 55% latex solids | 120 |
| Water | 335 |
| Antimony potassium tartrate | 20 |
| Alkyl phenoxypoly (ethylene oxyl)-ethanol (non-ionic surfactant) | 10 |
| Polyalkylene glycol (anti-foam agent) | 1 |
| Aqueous solution of anionic surface active blend of processed high melting sulfated, saturated fats having a solids content of about 60% (anti-foam agent) | 2 |
| Hydroxyethyl cellulose (thickener) | 6 |
| Glucose | 10 |
| Formaldehyde (37% solution) | 3 |
| Diethylene glycol monoethyl ether | 30 |
| Water soluble polyether derivative of linseed oil (85% solids) | 20 |
| Dibutyl phthalate | 40 |
| Ethylene glycol | 40 |
| | 992 |

In preparing the water-base paint composition, the weighed amounts of water, glucose and surfactant were introduced into a suitable container under continuous agitation. The titanium dioxide pigment was then added to the container and agitation continued until the pigment was uniformly dispersed. The antifoam agents, hydroxyethyl cellulose thickener, ethylene glycol, antimony potassium tartrate and formaldehyde were then added in sequence, under continuous agitation to the pigment dispersion. In a separate container, the acrylic copolymer latex, polyvinyl chloride latex, dibutyl phthalate, diethylene glycol monoethyl ether and polyether derivative of linseed oil were preblended for about 20 minutes under high speed agitation. This preblended mixture was then added to the aqueous pigment dispersion under continuous agitation and blended for about 20 minutes. The formulation yielded approximately 100 gallons of a water-base latex paint having a viscosity of 80±5 Krebs units and a pH of about 6.5. The paint composition thus formulated was applied as a primer coating on red cedar shingles, allowed to dry, and then coated with a commercially available water base latex finish coat. The coated shingles were then subjected to severe, accelerated weathering conditions in which the painted side of the shingles was continuously exposed to a cold chamber having a temperature of 23° F., while the unpainted side was exposed to a heat zone having a temperature at 90° F. and 84% relative humidity. The shingles were continuously exposed to these conditions for a period of five days. During this period, condensation from the hot zone kept the wood saturated with moisture. There was, however, no staining or discoloration of the paint.

Example II

A stain-resistant, oil-in-water emulsion was prepared in the following manner. A pigment dispersion was prepared by adding under continuous agitation 350 pounds of finely divided pigment, in an aqueous solution containing 10 pounds of gum arabic. While agitation was continued, 25 pounds of antimony potassium tartrate and 15 pounds of hydrated aluminum oxide were added to the pigment dispersion. A dispersion of 6 pounds guar gum in 10 pounds ethylene glycol was then introduced into the pigment dispersion and agitated until the guar gum was completely dispersed. 30 pounds of a dilute phosphoric acid solution (about 5%) was then added, with agitation, to the pigment dispersion. A blend of 215 pounds of linseed oil (treated), 10 pounds tung oil, and 15 pounds of a metallic soap drier was then added to the pigment dispersion under continuous agitation to form an oil-in-water emulsion. The pH of the paint composition was adjusted to 6.5 by the addition of phosphoric acid, and the viscosity was adjusted to 80–85 K.U. by the addition of water, thereby providing about 100 gallons of the paint. The paint composition thus formed, when applied as a primer coating, had excellent adhesion to previously painted, heavy chalking surfaces, and effectively stopped staining and discoloration when applied over previously unpainted, exterior redwood and red cedar surfaces.

Thus, according to the present invention, water-base paint compositions which are resistant to staining and discoloration can be provided by incorporating in the composition a tannin precipitant and a dye mordant and controlling the pH of the composition to neutral or slightly acid value. Also, when free oxidizing agents are present in the paint, reducing agents are also incorporated in the composition. The present invention thereby provides an effective method for preventing staining and discoloration of water-base paint coatings over exterior wood substrates due to the leaching of naturally occurring, water soluble substances in the wood. The water-base paint composition of this invention, when applied as a primer coating, makes it possible to use a complete water-base paint system over previously painted or unpainted exterior wood surfaces, including redwood and red cedar surfaces, without fear of subsequent staining of the paint by water soluble substances in the wood.

While the invention has been described in connection with specific embodiments thereof, it will be understood that it is capable of further modifications, particularly with respect to the components of the paint and their proportions, without departing from the spirit or scope of the invention. It will be further understood that the invention is not to be considered as limited to the precise embodiments shown and described, but is to be interpreted as broadly as permitted by the appended claims.

1. A water-base paint composition which comprises
an intimate mixture of a pigment,
a vehicle selected from the group consisting of an aqueous emulsion of a drying oil and an aqueous dispersion of a latex,
a tannin precipitant selected from the group consisting of antimony potassium tartrate and guar gum,
and a dye mordant selected from the group consisting of aluminum sulfate, aluminum phosphate, alums, and antimony potassium tartrate, said composition having a pH of no more than about 7.

2. A water-base paint composition as defined in claim 1 in which said composition contains from about 10 to 50 pounds of said tannin precipitant per 100 gallons of the composition, from about 10 to 20 pounds of said dye mordant per 100 gallons of the composition, and the composition has a pH in the range of 6 to 7.

3. A water-base paint composition as defined in claim 1 in which said composition contains
a vehicle consisting of an aqueous dispersion of a latex,
from about 10 to 50 pounds of said tannin precipitant per 100 gallons of the composition,
from about 10 to 20 pounds of said dye mordant per 100 gallons of the composition,
up to 10 pounds per 100 gallons of said composition of a reducing agent selected from the group consisting of glucose, formaldehyde, and mixtures thereof, and
a weak acid, said acid being present in an amount sufficient to reduce the pH of the composition to the range of about 6 to 7.

4. A water-base paint composition containing, as additives to prevent staining and discoloration, when applied over wood surfaces, due to the leaching of water soluble tannins and wood dyes from the wood,
a tannin precipitant to precipitate and inactivate the tannins present in the wood, and
a dye mordant to fix the water-soluble dyes present in the wood,
said water-base paint composition having a pH of no more than about 7.

5. A water-base paint composition as defined in claim 4 in which
said tannin precipitant is a material selected from the group consisting of antimony potassium tartrate and guar gum,
said dye mordant is a material selected from the group consisting of aluminum sulfate, aluminum phosphate, alums and antimony potassium tartrate, and
said composition has a pH in the range of about 6 to 7.

6. A water base paint composition as defined in claim 5 in which said composition contains
a vehicle consisting of an aqueous emulsion of a drying oil,
from about 10 to 50 pounds of antimony potassium tartrate per 100 gallons of said composition,
from about 10 to 20 pounds per 100 gallons of said composition of an aluminum salt selected from the group consisting of aluminum sulfate, aluminum phosphate and alums.

7. A water-base paint composition as defined in claim 4 in which said composition contains
a vehicle consisting of an aqueous dispersion of a latex, as a tannin precipitant, about 10 to 50 pounds per 100 gallons of said composition of antimony potassium tartrate, as a dye mordant, about 10 to 20 pounds per 100 gallons of said composition of an aluminum salt selected from the group consisting of aluminum sulfate, aluminum phosphate and alums, up to 10 pounds per 100 gallons of said composition of a reducing agent selected from the group consisting of glucose and formaldehyde, and a sufficient amount of a weak acid to provide the composition with a pH in the range of about 6 to 7.

8. A method of preventing staining and discoloration of water-base paints applied over wood surfaces, due to the leaching of water-soluble tannins and wood dyes from the wood, which comprises applying over said wood surfaces, as a primer coating, a water-base paint composition containing a tannin precipitant to precipitate and inactivate the tannins and a dye mordant to fix the water soluble dyes present in said wood surfaces, said water-base composition having a pH no higher than about 7.

9. A method as defined in claim 8 in which said water base paint composition comprises a vehicle selected from the group consisting of an aqueous emulsion of a drying oil and an aqueous dispersion of a latex, a tannin precipitant selected from the group consisting of antimony potassium tartrate and guar gum, a dye mordant selected from the group consisting of aluminum sulfate, aluminum phosphate, alums and antimony potassium tartrate.

References Cited

UNITED STATES PATENTS

| 2,053,208 | 9/1936 | Curtis | 134—58.5 |
| 3,325,425 | 6/1967 | Bray | 260—17 |

WILLIAM H. SHORT, *Primary Examiner.*

E. NIELSEN, *Assistant Examiner.*

U.S. Cl. X.R.

260—17, 29.6, 41; 106—206, 303